Feb. 5, 1929.

R. COON

BEET LOADER

Filed Feb. 12, 1927     2 Sheets-Sheet 1

Inventor
Roy Coon.
By A. J. O'Brien
Attorney

Feb. 5, 1929.　　　　　　　　　　　　　　　　　1,700,922
R. COON
BEET LOADER
Filed Feb. 12, 1927　　　　　2 Sheets-Sheet 2

Inventor
Roy Coon.
By
Attorney

Patented Feb. 5, 1929.

1,700,922

UNITED STATES PATENT OFFICE.

ROY COON, OF WINDSOR, COLORADO.

BEET LOADER.

Application filed February 12, 1927. Serial No. 167,726.

This invention relates to improvements in loaders of the type which gathers the material from the ground and elevates it into the body of a truck.

It often occurs that material such, for example, as beets, corn, potatoes, etc., must be loaded onto trucks for transportation from the field to the dump at the beet factory, or to some suitable storage place. In certain parts of our country sugar beets is one of the staple crops and is extensively cultivated. After the beets have been dug and topped, they must be transported to the factory and before this can be done, they must be loaded onto trucks. It is very hard work to transfer beets from the field into the body of the truck as the beets are heavy and the truck body is high. It is evident, therefore, that if some power operated means could be devised for gathering the beets and for elevating them into the truck, that a large amount of labor would be saved thereby.

It is the object of this invention to produce a device that will gather the beets from the surface of the ground and elevate them into the box or body of the truck.

It is another object to produce a device that will not injure the beets and which will be able to handle a large amount of material in a given time.

The above and other objects that may become apparent as the description proceeds, are attained by means of a construction and arrangement of parts which will now be described in detail, reference for this purpose being had to the accompanying drawings in which the preferred embodiment has been illustrated and in which.

Figure 1:
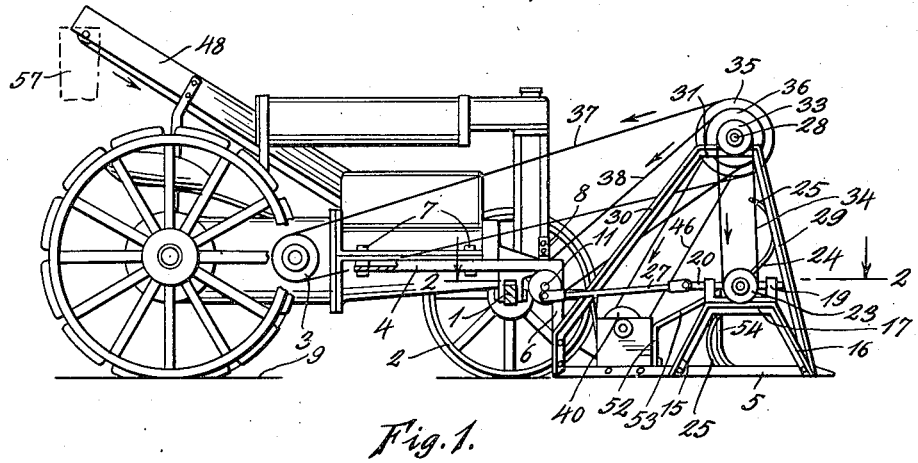
Fig. 1 is a side elevation of a tractor and shows my improved loader attached to the same.

In the drawing I have shown my device attached to a tractor by which it is propelled and which furnishes power for its operation, but I want it understood that this showing is illustrative only.

Numeral 1 designates the front axle of the tractor and 2 the front wheels, while 3 designates the power take-off. My loader, which has here been shown as attached to the tractor, consists of a frame having two side members, each of which has a horizontal portion 4 which is connected with a similar horizontal portion 5 by means of a vertical member 6. The rear ends of the members 4 are secured to the engine body by means of bolts 7 and the front ends of side bars 4 are attached to the radiator frame by means of brackets 8. The parts are so proportioned that when the tractor stands on a horizontal surface, like that represented by numeral 9, the lower sides of the bars 5 will lie parallel with and closely adjacent to the flat surface. In the actual construction a lost motion connection is provided instead of the bracket 8, but for the purpose of this description a rigid connection is assumed.

Figure 3:
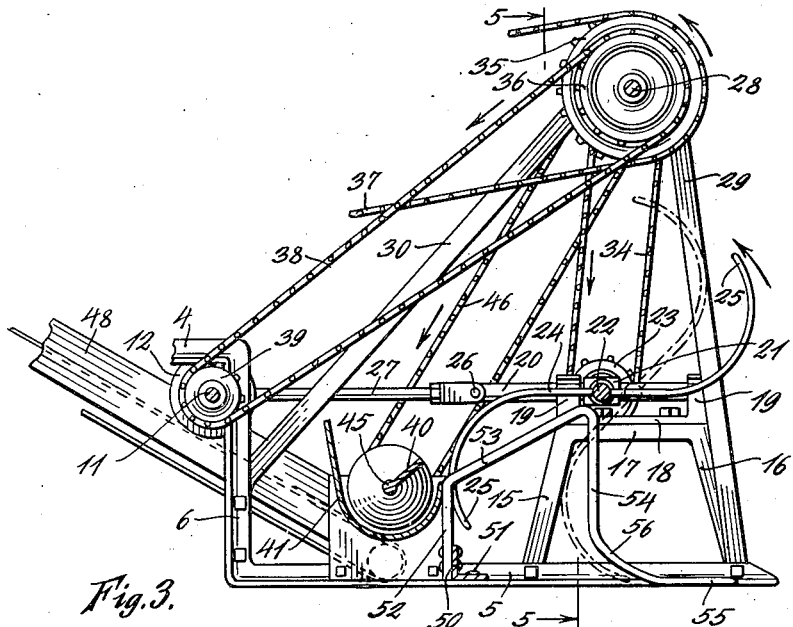
Fig. 3 is a vertical section taken on line 3—3, Fig. 2.
Figure 4:
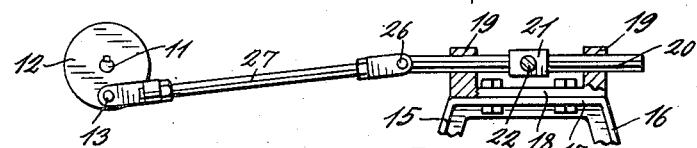
Fig. 4 is a view taken on line 4—4, Fig. 2, showing a detail of the construction, partly in elevation and partly in section.
Figure 5:
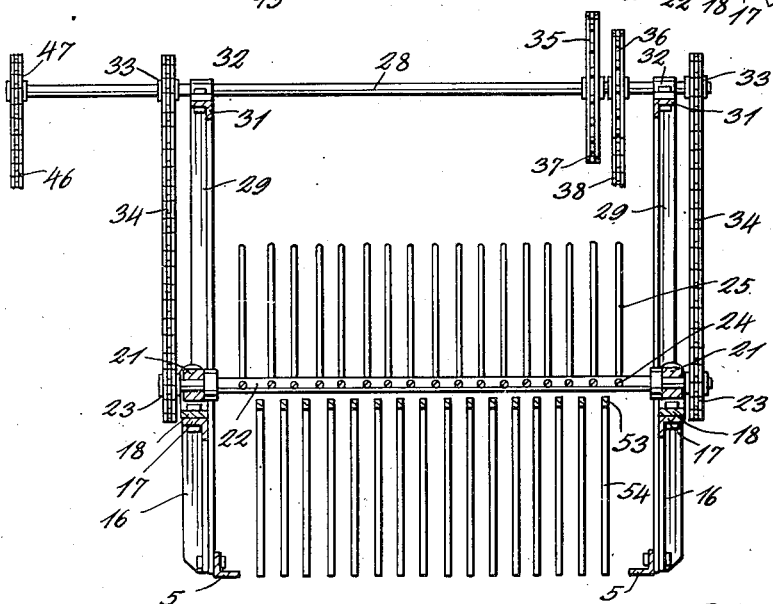
Fig. 5 is a section taken on line 5—5, Fig. 3.

Secured to the rear side of the vertical bars 6 are bearings 10 in which the shaft 11 is journalled. A crank disk 12 is secured to each end of shaft 11 and each disk carries a crank pin 13. Near the front end of each of the bars 5 I have secured brackets consisting of two upwardly inclined legs 15 and 16, whose upper ends are joined by a horizontal bar 17. Secured to the upper surface of bars 17 are brackets 18 having upwardly extending arms 19 that are perforated for the reception of the sliding bars 20, which each carry a bearing box 21 in which the shaft 22 is rotatably mounted. A sprocket wheel 23 is secured to each end of shaft 22. In the embodiment shown shaft 22 is provided with a large number of parallel diametrical openings through which the S-shaped teeth 24 extend. These teeth have their ends curved in opposite directions in the manner indicated by numeral 25 (Fig. 3). By referring to Figs. 4 it will be seen that the rear end of each of the bars 20 is pivotally connected at 26 to one end of a connecting rod 27 whose other end is connected with the crank pin 13, so that when the shaft 11 is rotated, the bearings 21 and the shaft 22 will be reciprocated.

For the purpose of supporting the shaft 28, I have provided two supporting brackets, each comprising upwardly inclined members 29 and 30, whose upper ends are connected by means of a horizontal bar 31. Bearing boxes 32 are secured to the bars 31 and in these the shaft 28 is journalled. Sprocket wheels 33 are non-rotatably secured to the shaft 28 and these are connected to similar sprocket wheels 23 on shaft 22 by means of chains 34.

Secured to shaft 28 between the bearings 32 are two sprocket wheels 35 and 36. A sprocket chain 37 connects the wheel 35 with the sprocket wheel 3 of the power take-off so that when the latter is rotating the various parts will be moving in the directions indicated by the arrows in Figs. 1 and 3. A sprocket chain 38 connects the sprocket wheel 36 on shaft 28 with the sprocket wheel 39 on shaft 11. Sprocket wheel 39 is one-half the diameter of wheel 36, while wheels 33 are of the same diameter as wheel 23 and therefore shaft 11 will be rotated twice during each rotation of shaft 22.

It will be observed therefore that shaft 22 will be moved forward and back two times during each revolution and the parts are so adjusted that when the teeth are rotated to the dotted line position (Fig. 3) they will at the same time be moving forwardly.

Secured to the side bars 5 and extending transversely is a screw conveyor 40 comprising a helical screw which is secured to shaft 45 and rotates in the box 41. One end of the shaft is journalled at 42 and the other at 43. A sprocket wheel 44 is secured to the other end of shaft 45 and this is connected by means of a sprocket chain 46 with the sprocket 47 on the outer end of shaft 28. When the parts are in motion, the screw conveyor will rotate so as to transfer material towards the belt conveyor 48 that is located on one side and extends upwardly and rearwardly. The lower end of conveyor 48 is located in such a position that it will receive the material from the screw conveyor and carry it upwardly. The conveyor 48 is driven by means of a sprocket chain 49 that cooperates with a sprocket wheel on shaft 45. An angle iron 50 extends transversely from one bar 5 to the other and has its ends securely fastened to the flanges of member 5 by means of rivets 51. Secured to the vertical flange of angle 50 are a plurality of bent fingers which have each a vertical portion 52 that extends upwardly to the upper edge of the box 41 and then continue with an upwardly and forwardly inclined portion 53 to a point adjacent the rearmost position of shaft 22 where they have a vertical portion 54 which is connected with the horizontal part 55 by means of a curved portion 56. The teeth 24 with their curved portion 25 are so spaced that when they rotate they pass between the fingers.

Figure 2:
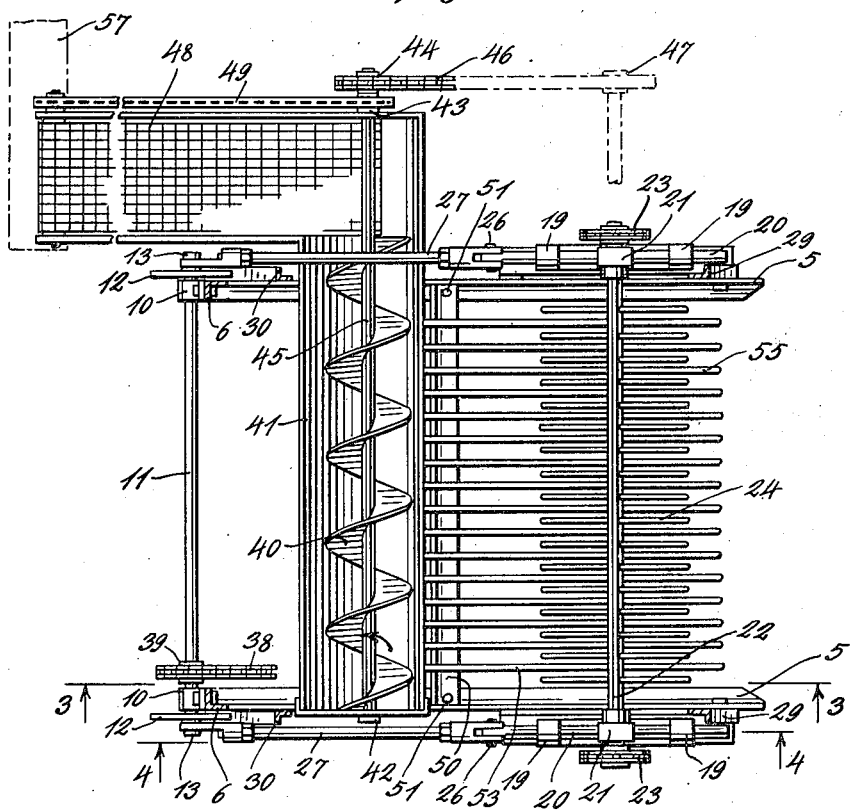
Fig. 2 is a view, partly in section, looking downwardly along line 2—2, Fig. 1.

When the loader is moved over the flat surface of a field in a forward direction, the beets will be gathered on the horizontal portions 55 of the fingers and at the same time the shaft 22 will rotate in a counter clockwise direction (Fig. 3). This will rotate the teeth in such a direction that they will be inserted underneath the beets that have collected on the fingers and, as the rotation continues, will raise them up and finally permit them to slide rearwardly into the transverse conveyor which will carry them onto the upwardly inclined conveyor 48 into the body of the truck by a chute 57, shown by dotted line in Figs. 1 and 2.

The rotation of crank shaft 11 and shaft 22 are so timed that when the fingers 24 are in approximately the position shown by dotted lines in Fig. 3, the cranks on shaft 11 will begin to move shaft 22 forwardly so as to impart to the fingers a motion similar to that imparted to a fork or a shovel when manually operated.

The motion of the fingers and their location is such that they cannot perforate the beets, but will be inserted underneath them.

The screw conveyor shown may be replaced by any other form of conveyor if desired.

Instead of attaching the loader to a tractor, the side members 5 may be extended rearwardly so as to serve as runners and the loader pulled by horses, in this case a small internal combustion engine may be attached to the device for the purpose of supplying the power necessary to run it.

Attention is called in particular to the construction which is such that the beets are raised upwardly by the fingers 24 and permitted to slide into the transverse conveyor.

Having described the invention what I claim as new is:

1. A loader comprising, in combination, a framework, a conveyor secured to and extending transversely of the framework, a plurality of spaced teeth secured to the framework and extending longitudinally thereof, said teeth being adapted to gather and support material, a shaft rotatably connected with the frame, means for rotating the shaft, means carried by the shaft for raising the material from the fingers and depositing it in the conveyor, said last named means comprising a plurality of S-shaped teeth, and means for reciprocating the shaft as it rotates.

2. A beet loader comprising, in combination, a framework adapted to be moved along the ground, a conveyor connected with and extending transversely of the framework, a plurality of gathering teeth secured at one end to said framework and extending in the direction of movement, a shaft rotatably secured to the framework at a point above the teeth and to the front of the conveyor, means for rotating the shaft, means for reciprocating the shaft while it rotates, and a plurality of S-shaped teeth secured to the rotatable shaft and so arranged that their ends point in the direction of rotation.

3. A beet loader comprising, in combination, a framework adapted to be moved along the ground, a conveyor connected with and extending transversely of the framework, a plurality of gathering teeth secured at one end to said framework and extending in the direction of movement, a shaft rotatably secured to the framework at a point above the teeth and to the front of the conveyor, means for rotating the shaft, means for reciprocating the shaft while it rotates, and a plurality of S-shaped teeth secured to the rotatable shaft and so arranged that their ends point in the direction of rotation, said teeth being spaced the same distance apart as the fingers and so located that they will pass in between the fingers when the shaft rotates.

4. A loader comprising, in combination, a framework, a conveyor secured to and extending transversely of the framework, a plurality of spaced teeth secured to the framework and extending longitudinally thereof, said teeth being adapted to gather and support material, a shaft rotatably connected with the frame, means for rotating the shaft, means carried by the shaft for raising the material from the fingers and depositing it in the conveyor and means for reciprocating the shaft as it rotates.

5. In a machine of the class described, in combination, a frame, a shaft rotatably connected with said frame, means for rotating the shaft, said shaft having an elevating member whose end is curved in the direction of rotation and means for reciprocating the shaft as it rotates.

6. In a machine of the class described, in combination, a frame, a shaft rotatably connected with said frame, means for rotating the shaft, said shaft having an elevating member secured thereto, and means for reciprocating the shaft as it rotates.

In testimony whereof I affix my signature.

ROY COON.